United States Patent
Stairs et al.

[11] Patent Number: 5,909,799
[45] Date of Patent: Jun. 8, 1999

[54] SELF CLEARING CONVEYOR

[75] Inventors: D. Leonard Stairs, Manheim; Lam T. Nguyen, Lancaster, both of Pa.

[73] Assignee: Aggregates Equipment, Inc., Leola, Pa.

[21] Appl. No.: 09/038,181

[22] Filed: Mar. 10, 1998

[51] Int. Cl.⁶ .................................................. B65G 37/00
[52] U.S. Cl. ............................................................ 198/622
[58] Field of Search ................................... 198/622, 623; 141/125

[56] References Cited

U.S. PATENT DOCUMENTS

| | | | |
|---|---|---|---|
| 628,951 | 7/1899 | Metzenaur | 141/125 |
| 2,728,510 | 12/1955 | Dunnican et al. | 141/125 |
| 3,067,855 | 12/1962 | Lambert | 198/622 |
| 3,179,131 | 4/1965 | Kissling | 141/125 |
| 4,153,084 | 5/1979 | Payne | 141/80 |
| 4,273,495 | 6/1981 | Pannell | 414/272 |
| 4,324,495 | 4/1982 | Martinez | 198/622 |
| 5,363,887 | 11/1994 | Haeberli | 141/125 |
| 5,477,957 | 12/1995 | Bold | 198/622 |

FOREIGN PATENT DOCUMENTS

| | | | |
|---|---|---|---|
| 49998 | 5/1966 | German Dem. Rep. | 198/622 |
| 814276 | 9/1951 | Germany | 198/622 |

*Primary Examiner*—William E. Terrell
*Assistant Examiner*—Khoi H. Tran
*Attorney, Agent, or Firm*—Martin Fruitman

[57] ABSTRACT

The apparatus is a self clearing conveyor for materials which clump together. A rotating multi-faced drum is located above the moving surface of a conveyor and rotates in a direction opposite from the movement of the conveyor. Material which is higher than the adjustable clearance between the drum and the conveyor is thrown upstream on the conveyor to try again, even if the material is initially stuck to or entangled with material passing below the drum.

6 Claims, 1 Drawing Sheet

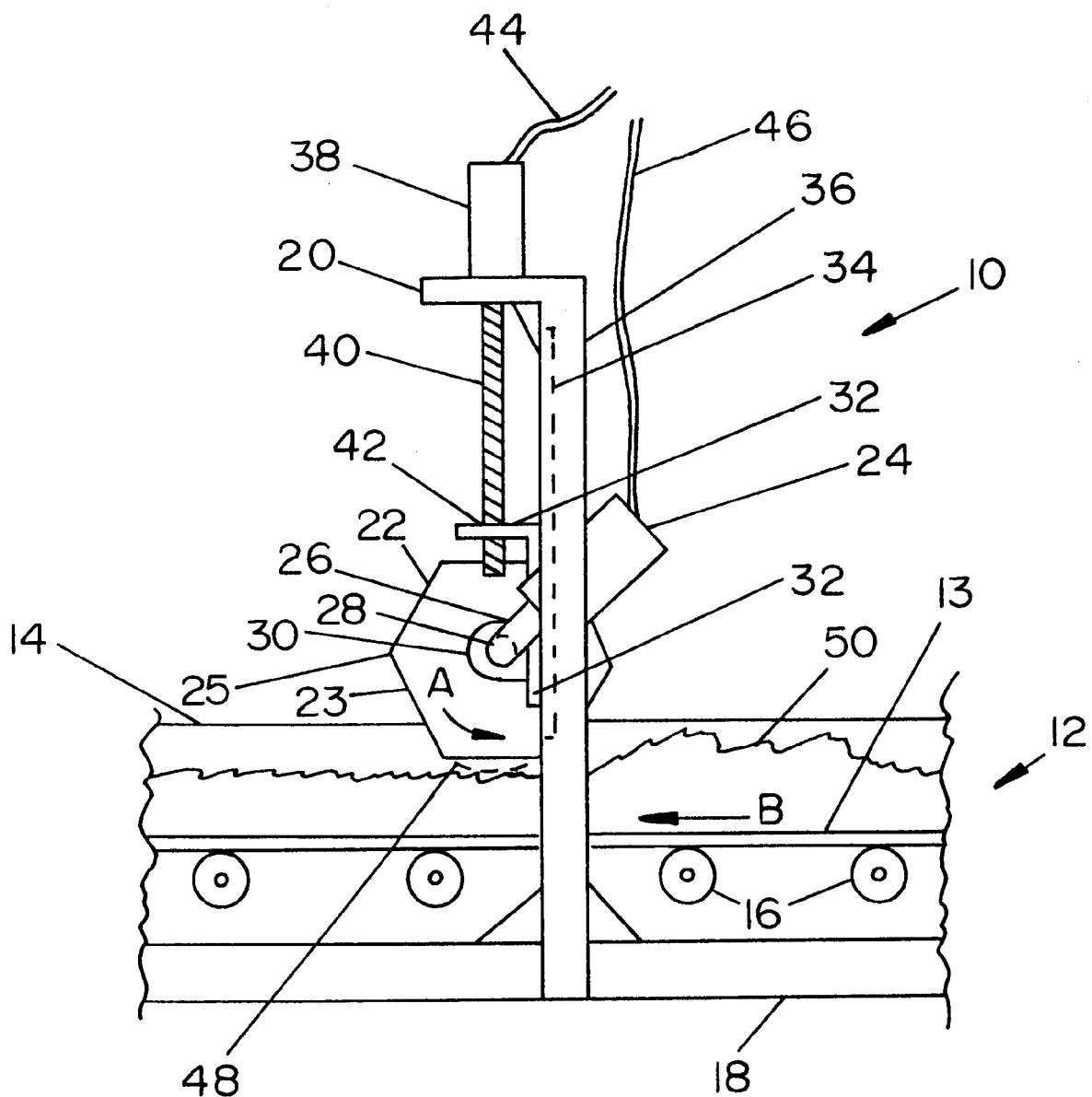

SELF CLEARING CONVEYOR

BACKGROUND OF THE INVENTION

This invention deals generally with conveyors and more specifically with an apparatus to prevent blockage on a conveyor which moves materials that tend to adhere together or entangle to form large masses.

A common problem of conveyors with linearly moving surfaces, such as chain or belt conveyors, which handle organic materials is the tendency of such materials to either clump together because of their moisture content or to entangle to form large accumulations of the material. Sod and tree branches are typical examples of the two types of materials which have these characteristics. Unfortunately, in a typical conveyor system, such large bodies of material eventually contact some discontinuity, for instance a flow control device or an edge in the sidewalls of the conveyor, get caught, and stop moving. Since large bodies of material have such great size and weight, once they stop moving they tend to accumulate more material upstream and the entire conveyor becomes blocked. Typically the only solution is to shut down the conveyor, climb in, and clear it by hand. Such manual clearing, of course, decreases production time and increases labor costs.

SUMMARY OF THE INVENTION

The present invention provides an apparatus which prevents such blockages by continuously breaking up any masses which are too large to pass under a prescribed height.

The invention is a rotating multi-faced drum located above the linearly moving surface of the conveyor and spanning the distance across the conveyor width. The drum rotates in the direction which causes the surfaces of the drum nearest to the conveyor's moving surface to move in a direction opposite to the movement of the conveyor surface, and during rotation, the edges at which the several faces of the drum meet extend into the material on the conveyor enough to pick up the top material they contact and throw it upstream on the conveyor. This continuous "shoveling" of any material extending higher than the edges of the drum prevents any build up and blockage of the material downstream of the drum.

The suggestion of shoveling is not very far from the action which is actually occurring. The motion of the flat faces of the drum is very similar to the motion which occurs when a simple hand shovel is used to push off the top of a pile of material without throwing material into the air. The significant difference, however, is that the rotating speed of the drum propels the material farther back upstream than can be done manually, and the movement of the several faces of the rotating drum provides continuous and repeated "shoveling".

Furthermore, as compared to the prior art systems of simple gates across the top of the conveyor, the much greater linear speed of the drum faces, compared to the linear speed of the conveyor surface, provides momentum to move the material upstream. The significant upward force of the rotating faces also provides a lifting force to separate the top material from the material on the conveyor.

To better accommodate various materials and applications, the invention includes an apparatus to adjust the height of the drum above the conveyor surface. In the preferred embodiment of the invention the adjustment is accomplished by moving the supporting frame for the drum with vertical threaded rods. Thus when the threaded rods are turned by a motor, the drum is lowered or raised.

With the drum itself rotated by a variable speed motor and the ability to also adjust the drum height above the conveyor, the present invention furnishes a versatile device for preventing blockages in conveyors which handle a variety of materials.

BRIEF DESCRIPTION OF THE DRAWING

The FIGURE is a side view of the preferred embodiment of the invention installed on a conveyor.

DETAILED DESCRIPTION OF THE INVENTION

The FIGURE is a side view of the preferred embodiment of the invention in which rotating drum assembly 10 is installed above conveyor 12. Conveyor 12 is of conventional construction with linearly moving surface 13, sides 14 (the near side is not shown, for better visibility of the structure), conveyor supporting rollers 16, and supporting base 18.

Bridge structure 20 is installed above and spans the width of conveyor 12 by being attached to and supported from supporting base 18, and rotating drum assembly 10 is supported upon bridge structure 20.

Rotating drum 22 is dimensioned to fit between sides 14 of conveyor 12, with enough clearance to assure there is no mechanical interference, and rotating drum 22 is constructed with multiple faces 23 and corners 25 where the faces join. In the preferred embodiment rotating drum 22 has six faces, but this quantity may be any number greater than two, depending upon the size of rotating drum 22. Drum 22 is rotated by motor 24 through drive train 26. Axle 28 of rotating drum 22 is held within bearing 30 which is attached to frame 32, and frame 32 is captured by and moves vertically on guide 34, which is on vertical support 36 of bridge 20.

The height of rotating drum 22 above linearly moving surface 13 of conveyor 12 is adjusted by reversible motor 38 which drives one or more threaded rods 40. Threaded rod 40 mates with threaded hole 42 on frame 32. Thus, as reversible motor 38 turns threaded rod 40, frame 32 and rotating drum 22 are raised or lowered. Reversible motor 38 and motor 24 can be either electrical or hydraulic motors, and they are powered through lines 44 and 46, respectively, from conventional power sources (not shown). Moreover, motor 24 can be either single speed or variable speed.

In operation, rotating drum 22 is rotated in direction A, which is opposite to the direction of movement B of moving surface 13 directly below rotating drum 22, and the multiple corners 25 of rotating drum 22 prescribe path 48. This rotation causes drum 22 to continuously contact top portions 50 of the material on conveyor 12 which are higher than path 48, and to throw top material 50 back upstream from drum 22. Such constant redistribution upstream eventually causes top material 50 to settle into depressions and voids in the material stream until eventually the material moves under drum 22 without being thrown upstream.

In the preferred embodiment of the invention, linearly moving surface 13 is a chain conveyor with a width of 36 inches between the sides 14, and drum 22 is 35 inches wide with six faces 23 and a diameter of 30 inches between corners 25. When moving organic yard waste, drum 22 is typically set so that path 48 is 8 inches above moving surface 13, and when surface 13 moves at a linear speed of 8 feet/minute, drum 22 is rotated at 2 revolutions per minute. These conditions have been found to satisfactorily prevent virtually all blockages downstream from drum 22.

The present invention thereby eliminates a common problem in moving surface conveyors, and not only reduces down time and costs, but also solves a significant safety problem by making it unnecessary for personnel to reach into or climb upon a conveyor to clear material jams.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, linear moving surface 13 of conveyor 12 may be either a belt or a chain conveyor, drum 22 may have more or fewer faces 23, and, of course, the size and speed of rotation of drum 22 may vary. Moreover, the means for raising and lowering drum 22 may be apparatus other than threaded rod 40, such as hydraulic pistons or gears and pinions.

What is claimed as new and for which Letters Patent of the United States are desired to be secured is:

1. A self clearing conveyor comprising:

a base structure;

a linear moving surface upon which material can be placed, the linear moving surface moving in a first direction and supported upon the base structure;

a drum with at least three faces, supported above the linear moving surface, with the drum axis oriented transverse to the linear moving surface and the drum rotating in a manner such that the drum surfaces nearest to the linear moving surface move in a direction opposite to the first direction; and means for rotating the drum.

2. The conveyor of claim 1 further including a means to adjust the height of the drum above the linear surface.

3. The conveyor of claim 1 further including a threaded rod driven by a motor and mating with a threaded hole in a support structure for the drum, with the threaded rod operating to adjust the height of the drum above the linear moving surface.

4. The conveyor of claim 1 wherein the means to rotate the drum is a variable speed motor.

5. The conveyor of claim 1 wherein the drum has six sides.

6. The conveyor of claim 1 wherein the drum is supported upon a bridge structure which is attached to the base structure and spans the linear moving surface.

* * * * *